UNITED STATES PATENT OFFICE.

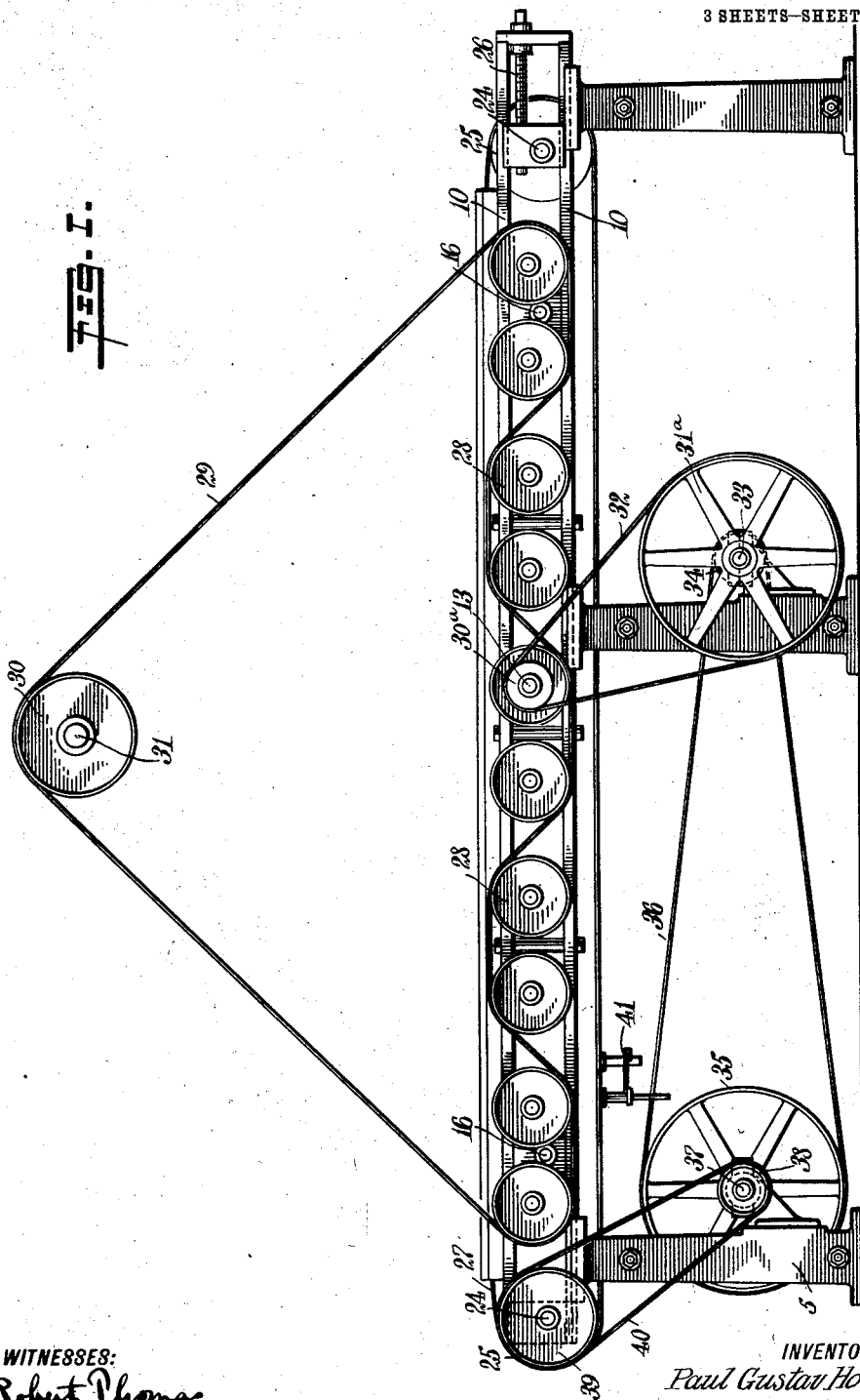

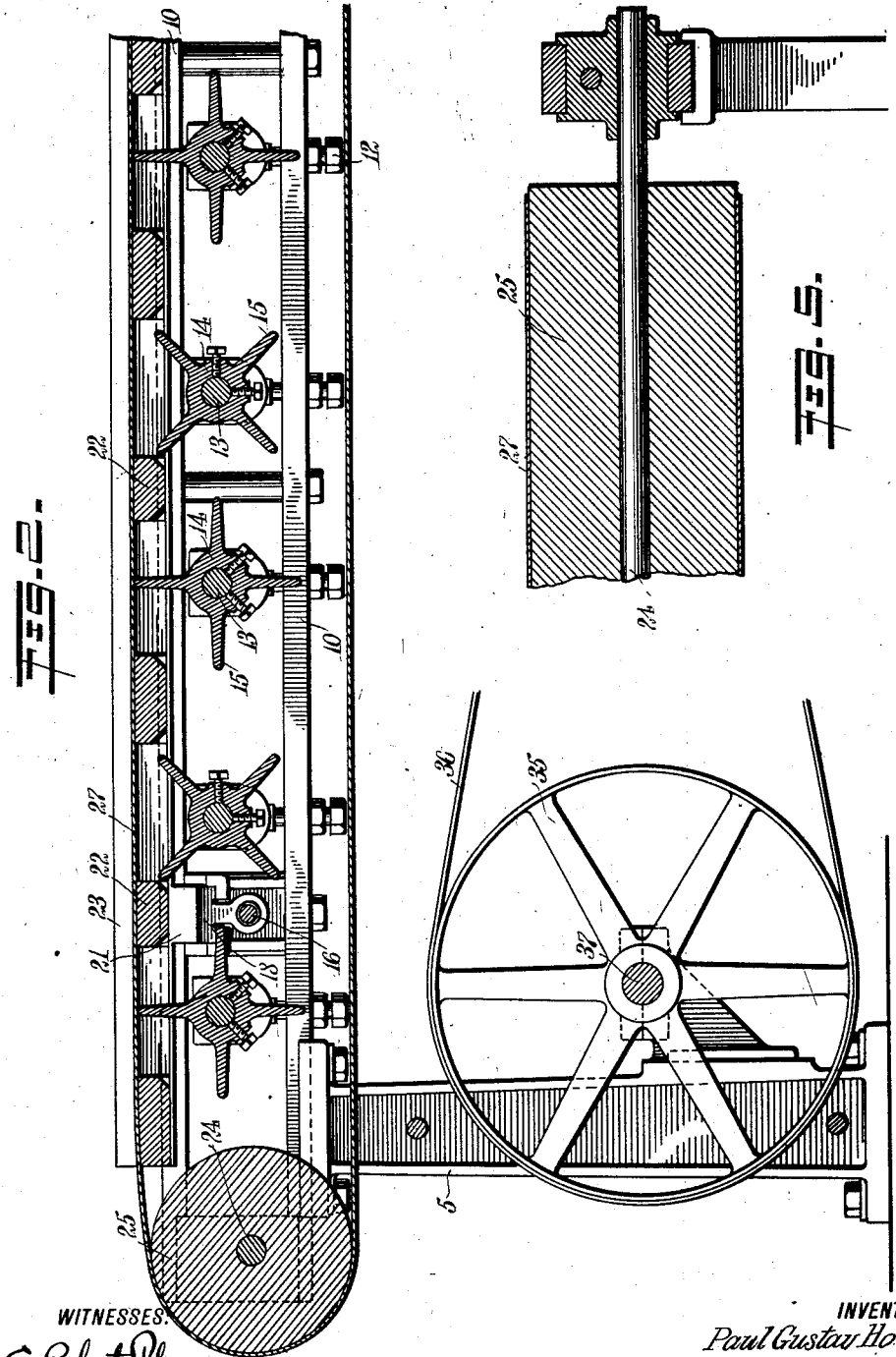

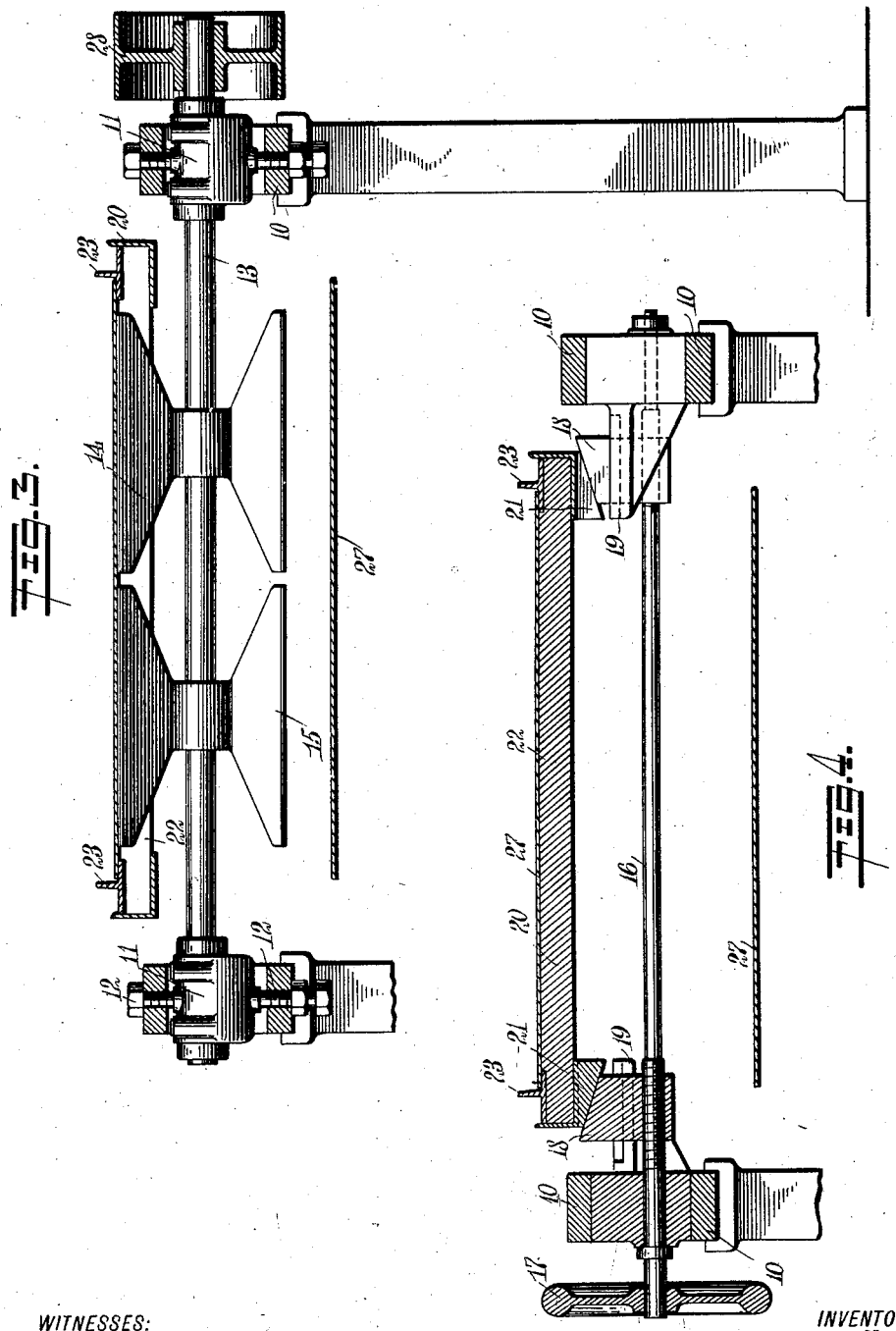

PAUL GUSTAV HOLLSTEIN, OF HOBOKEN, NEW JERSEY, ASSIGNOR TO J. M. LEHMANN CO., OF NEW YORK, N. Y.

AGITATOR.

1,011,621.  Specification of Letters Patent.  Patented Dec. 12, 1911.

Application filed July 8, 1910. Serial No. 570,922.

*To all whom it may concern:*

Be it known that I, PAUL GUSTAV HOLLSTEIN, a citizen of the United States, and a resident of Hoboken, in the county of Hudson and State of New Jersey, have invented a new and Improved Agitator, of which the following is a full, clear, and exact description.

The invention is an improvement in agitators, such as are designed for agitating chocolate molds and expelling air bubbles from blocks of chocolate, such as chocolate candy and chocolate drops; and has in view an agitator which operates with any amount of vibration within certain limits, and with considerably less noise and of larger capacity than the agitator now in use for this purpose; also an agitator which will operate while the support for the molds or mold carrier is stationary as regards linear movement, or while operating as a conveyer to carry the molds from one end of the machine to the other.

Reference is to be had to the accompanying drawings forming a part of this specification, in which similar characters of reference indicate corresponding parts in all the views.

Figure 1 is a side elevation of an agitator constructed in accordance with my invention; Fig. 2 is a fragmentary longitudinal vertical section of the same; Fig. 3 is a fragmentary transverse section of the agitator in line with one of the jarrer shafts; Fig. 4 is a similar section in line with one of the adjusting devices for the belt or apron table; and Fig. 5 is a similar section in line with one of the belt or apron rolls.

In the construction of the agitator I provide a frame 5, having at each side bearing supporting bars 10, 10, arranged one above the other, ordinarily substantially horizontally, and extending approximately the full length of the machine. Between these bars at intervals within short distances of the end portions thereof and at each side of the machine are arranged bearings 11, these bearings, as best shown in Fig. 2, being held in place between vertical adjusting screws 12, engaging each bearing at both the bottom and top, and affording a limited adjustment. In each set of alining bearings 11 is journaled a shaft 13 having attached thereto between the two sides of the frame a jarrer 14, the jarrer being shown to be made of two half sections, each section having a number of radially-arranged strikers 15, the outer edges of which are arranged approximately parallel to the shaft 13.

Near each end of the machine frame is journaled an adjusting screw 16 having an operating handle or handwheel 17, at the outside of the frame, and provided with right and left-hand threaded portions respectively screwing into supporting blocks 18, the latter being slidably carried in guides 19 arranged adjacent to and at the inner side of the side bars 10, and each provided with a beveled upper face inclining downwardly and inwardly. On the supporting blocks of each screw at the opposite ends of the machine seats a table 20, the table having reversely-beveled bearing blocks 21, seating on and conforming to the beveled faces of the blocks 18, and constructed of a series of cross-bars or slats 22 rigidly secured together at the ends by angle-bars 23, each bar, as best shown in Fig. 4, being preferably of T-form, with the upwardly projecting flange serving as a guide.

At or near each end of the machine is journaled in bearings arranged between the bearing supporting bars 10, a cross-shaft 24, each cross-shaft having secured thereto between the two sets of side bars, a roll 25, the bearings for one of these rolls, as shown in Fig. 1, being slidable between the bars 10, and each operatively engaged by an adjusting screw 26. The tops of the rolls 25 are substantially on a level with the tops of the strikers of the jarrers when the strikers are at their extreme uppermost position; and around these rolls is arranged to travel an apron or belt 27, the belt being of a width substantially equal to the distance between the guide flanges of the angle-irons, as shown in Fig. 4, whereby there is no opportunity of the belt shifting laterally on the rolls. The belt is made of canvas or other flexible material and constitutes a flexible support for the articles to be agitated. The belt passes over the table 20, and when the latter is in position on the machine, the jarrers fall opposite the spaces or intervals between the cross-bars or slats 22, so that when the table is fully lowered, the strikers will, in their revolution, contact directly with the under side of the belt.

At one side of the machine is secured to the end of each of the shafts 13, a pulley 28, and in driving engagement with the several pulleys, as shown in Fig. 1, is a belt 29 passing over a pulley 30 on a countershaft 31, the belt 29 successively passing under and over each pair of pulleys throughout the series, the belt engaging the pulleys so that the strikers of one jarrer are arranged opposite the intervals of the strikers of the adjacent jarrers, as shown in Fig. 2, whereby the adjacent jarrers act on the belt in alternate order and give an effective vibratory action, although the particular manner of driving the jarrers is not a matter of importance. In addition to the pulley 28, a pulley 30ª is secured to one of the shafts 13 and is operatively connected to a large pulley 31ª by a belt 32, the pulley 31ª being secured to a shaft 33 suitably supported on the lower portion of the machine frame and having a pulley 34, which in turn is connected to a pulley 35 by a belt 36, the pulley 35 being secured to a shaft 37, similarly supported at the end of the machine having the fixed roll 25, and having an attached pulley 38 connected to a pulley 39 by a belt 40, the pulley 39 being secured to the shaft 24 of the fixed roll. The pulley 35 embodies both a fixed and loose pulley, as shown in broken section in Fig. 1, on which the belt 36 is alternately movable and controlled by any suitable belt shifter 41.

When the machine is set up, the bearings 11 are adjusted so that the several jarrers stand substantially the same distance from the belt when the table is substantially level, and the strikers will bear uniformly on the belt through their length, whereby no more vibration is had at one side of the belt than at the other. If the machine is to be used as an ordinary stationary vibrator, the chocolate molds containing the drops or pieces of chocolate are seated at any point on the belt and allowed to remain until the air bubbles have been forced out. Ordinarily, however, operators will stand at the opposite ends of the machine, and one will place the chocolate molds on the belt while the other removes them. By thus operating the machine, the belt shifter 41 will be moved to cause the belt to travel as the agitation proceeds. By adjusting the table by means of the handwheel 17, to lower and elevate the belt, any desired intensity of agitation may be obtained within certain limits. If desired, one end of the table can be arranged at a higher elevation than the other, whereby the vibration gradually increases and decreases from one end of the working length of the belt to the other.

Although I have described my improved agitator in detail, I nevertheless recognize that many immaterial changes may be made within the scope of my invention, which is limited by the claims only.

Having thus described my invention, I claim as new and desire to secure by Letters Patent:

1. In an agitator, a frame, rolls carried by the frame, a belt to support the articles to be agitated, movably carried on the rolls, a table supported on the frame, over which the belt passes, having a series of cross-bars, jarrers arranged under the upper length of the belt to strike and agitate the belt between the cross-bars of the table, and means to raise and lower the table to adjust the intensity of the agitation.

2. In an agitator, a frame, supporting blocks carried by the frame and adjustable to and from each other, a table bearing and supported on the supporting blocks, with the bearings of the supporting blocks and table beveled to cause the table to move vertically when the blocks are adjusted to and from each other, a flexible support for the articles to be agitated, passed over the table, and a series of jarrers arranged under to strike and agitate the support.

3. In an agitator, a frame, a series of jarrers journaled in the frame, a table vertically adjustable over the jarrers and having cross slats arranged over the intervals between the jarrers, and a belt for supporting the articles to be agitated, passing over the table and arranged to be struck by the jarrers between the slats of the table.

4. In an agitator, a flexible support for the articles to be agitated, and a series of rotary jarrers arranged to agitate the support, each jarrer having strikers extending therefrom, with the strikers of each jarrer arranged opposite the intervals between the strikers of the adjacent jarrers.

5. In an agitator, a frame, a roll journaled at the opposite end portions of the frame, an adjusting screw arranged transversely of and near each end of the frame, each adjusting screw having a right and a left-hand threaded portion, supporting blocks slidably supported on the frame and each engaged with one of the threaded portions of one of the adjusting screws, a table seated on the supporting blocks, with the bearing faces of the blocks and the bearing portions of the table inclined in a direction to cause the table to move vertically by the actuation of the adjusting screws, a belt passing over the rolls and table, and a series of rotary jarrers arranged to strike and agitate that portion of the belt passing over the table.

In testimony whereof I have signed my name to this specification in the presence of two subscribing witnesses.

PAUL GUSTAV HOLLSTEIN.

Witnesses:
E. SMILEY,
E. KEHMANN.

Copies of this patent may be obtained for five cents each, by addressing the " Commissioner of Patents, Washington, D. C."